[19] United States Patent
Kronstadt

[11] 3,926,075
[45] Dec. 16, 1975

[54] VEHICLE AUTOMATIC TRANSMISSION HAVING PUSH START CAPABILITY
[75] Inventor: Victor Kronstadt, Hagerstown, Md.
[73] Assignee: Mack Trucks, Inc., Allentown, Pa.
[22] Filed: Oct. 18, 1974
[21] Appl. No.: 515,832

[52] U.S. Cl. .................. 74/867; 60/405; 123/179 P
[51] Int. Cl.² ........................................ B60K 41/00
[58] Field of Search ............ 60/403, 404, 405, 444, 60/486; 180/66 R; 74/867, 860, 864; 123/179 F, 179 P

[56] References Cited
UNITED STATES PATENTS
3,654,758   4/1972   Aoyama et al. ..................... 60/492

Primary Examiner—Samuel Scott
Assistant Examiner—Frank H. McKenzie, Jr.
Attorney, Agent, or Firm—Brumbaugh, Graves, Donohue & Raymond

[57] ABSTRACT

An auxiliary transmission oil pump, driven from the output shaft of a vehicle automatic transmission, by-passes the transmission automatic control logic and supplies pressurized oil to operate the appropriate clutch or clutches to provide a suitable transmission ratio during a push or tow start of the vehicle. The output of the auxiliary pump is controlled by the vehicle direction control valve so that push starting may be accomplished only when the control valve is in the "forward" position. Once the engine starts, the main transmission oil pump absorbs the flow from the auxiliary pump so that the transmission automatic control logic directs the operation of the transmission.

8 Claims, 1 Drawing Figure

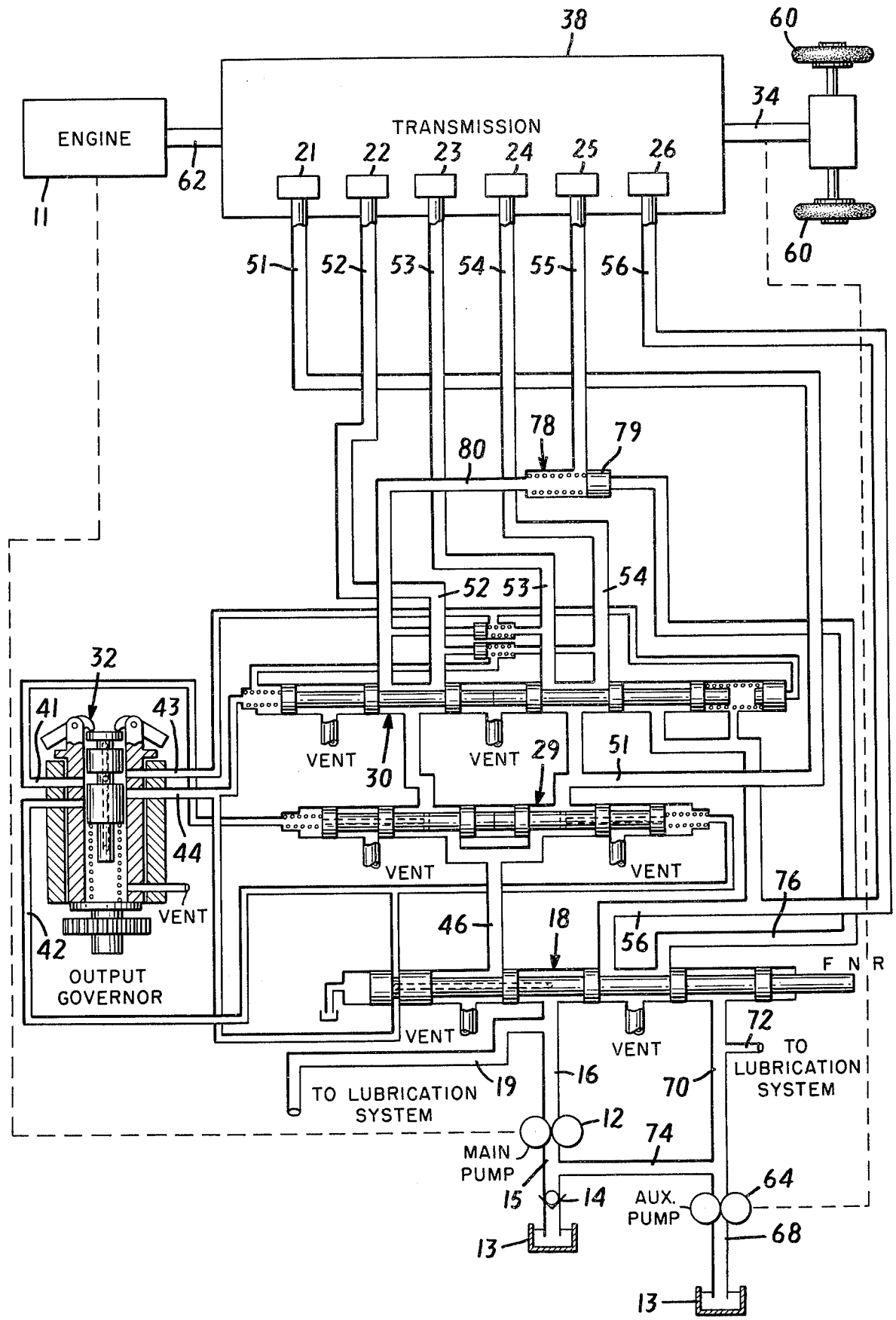

VEHICLE AUTOMATIC TRANSMISSION HAVING PUSH START CAPABILITY

BACKGROUND OF THE INVENTION

This invention relates to automatic transmissions and, more particularly, to apparatus providing a push start capability for vehicles equipped with automatic transmissions.

In vehicles with hydrostatic transmissions, such as that disclosed in U.S. Pat. No. 3,243,959, a push or tow start of the vehicle can be accomplished when the battery or starting motor is defective by supplying pressurized oil from the motor that normally drives the wheels, to the cylinder which controls the swash plate of the pump connected to the engine. In this way the swash plate of the pump is adjusted so that the pump may be driven as a motor, even though the engine is not operating. Then, when the vehicle is pushed or towed, the wheels will drive the motor as a pump and the pressurized oil from the motor will drive the pump as a motor. Since the pump is connected to the engine, pushing the car will cause the engine to turn over and start.

The U.S. Pat. Nos. 3,533,234 and 3,654,758 disclose other hydrostatic transmissions having a capability for push starting a vehicle.

In a hydromechanical transmission it is necessary to engage the appropriate clutch or clutches before the engine can be connected to the wheels. Under normal conditions the clutches are operated through hydraulic control logic with oil supplied from a main transmission oil supply pump driven by the engine. Prior methods for achieving a push start employed a pump driven off the output shaft of the transmission to supplement the oil flow to the control logic of the transmission from the main transmission pump so that a suitable push start transmission ratio would be provided. In many cases this ratio was chosen to avoid rear wheel skidding, which necessitated relatively high vehicle speeds in order to start the engine, with consequent safety hazards.

SUMMARY OF THE INVENTION

The present invention is directed to simplifying the equipment required for push starting a vehicle equipped with an automatic transmission. This is accomplished by having an auxiliary pump, which is mechanically connected to the wheels, supply pressurized liquid directly to the appropriate clutch or clutches of the transmission to provide a suitable push starting transmission ratio, the transmission automatic control logic being completely bypassed.

In an illustrative embodiment of the invention an automatic transmission is equipped with an auxiliary pump coupled to its output shaft. This auxiliary pump supplies liquid under pressure to a manually operated direction control spool valve when the vehicle is pushed or towed. If the direction control valve is set in the "forward" position, the control valve will pass the pressurized liquid directly to the clutch or clutches which provide the appropriate transmission ratio for a push start. The pressurized liquid engages these clutches and provides a mechanical connection with the desired transmission ratio between the wheels, which are turned when the vehicle is moved, and the engine.

Before the engine is started, the automatic control logic exerts no control over the various clutches of the transmission, even though the direction control valve is in the "forward" position, inasmuch as the engine does not drive the main transmission pump sufficiently to supply such pressurized liquid to the automatic control logic as will affect the operation of the clutches. With this arrangement, the vehicle is started only when the transmission is in the "forward" position, and yet the automatic control logic is bypassed. When the engine starts, the main transmission pump supplies sufficiently pressurized liquid to the automatic control logic that the operation of the transmission clutches is under the control of the automatic control logic, and the main pump also absorbs the output from the auxiliary pump such that the auxiliary pump has no control over any transmission clutch.

BRIEF DESCRIPTION OF THE DRAWINGS

The foregoing and other features of the present invention will be more readily apparent from the following detailed description and drawings, in which the single FIGURE is a schematic diagram of a hydraulic control logic system for an automatic transmission employing the present invention.

DESCRIPTION OF AN EXEMPLARY EMBODIMENT

The single FIGURE of the drawings is a schematic diagram of a hydraulic control logic for an automatic transmission. This transmission may be a conventional hydromechanical transmission employing a plurality of hydraulically actuated clutches for establishing a plurality of transmission ratios or mechanical advantages, for example. The transmission may include one or more planetary gears, the operation of which may be changed to select the transmission ratios by energizing the appropriate clutch to lock the corresponding planetary gear element, and/or may include one or more conventional torque converters whose operation may be changed by energizing one or more lock-up clutches. Such automatic transmissions are well known to those skilled in the art, and as a description and explanation is unnecessary for an understanding of the present invention.

Under ordinary conditions, the vehicle engine 11 drives a conventional main transmission oil supply pump 12 that draws oil from a reservoir 13 through a check valve 14 and conduit 15 and delivers pressurized oil through a conduit 16 to a manual direction control spool valve 18, and through a conduit 19 to the conventional transmission lubrication system (not shown).

The direction control valve 18 is shown in the "neutral" position, in which position the hydraulic conduits to various transmission clutches 21–26 are vented. When the valve 18 is moved to the "forward" position, pressurized oil from the pump 12 can pass through the direction control valve 18 to a pair of spool valves 29 and 30 of conventional automatic control logic, which need not be discussed in detail for an understanding of the present invention. The positions of the spool valves 29 and 30 are determined by a conventional output governor 32, which is coupled to the output shaft 34 of the transmission 38 through conventional means (not shown). As the output shaft 34 reaches predetermined speeds, pressure signals from the output governor 32 are applied to the spool valves 29 and 30 through a plurality of conduits 41–44. These pressure signals set the spool valves 29 and 30 to the proper positions so that pressurized oil from the pump 12 is supplied through the direction control valve 18 and a conduit 46, when the direction control valve is in the "forward" position, to energize the proper ones of the clutches 21–25 associated with conventional planetary gears (not shown) of the transmission 38 for the forward transmission ratios. The pressurized oil is supplied to the clutches 21–25 through a plurality of conduits 51–55, respectively.

When the direction control valve 18 is in the "reverse" position, the conduit 46 is vented to disengage the clutches 21–23 and 25, and pressurized oil is supplied through a conduit 56 to energize the clutches 24 and 26, inasmuch as the pressurized oil in the conduit 56 displaces the spool valve 30 to the left so as to communicate the conduit 56 with the conduit 54. Thus, the clutch 24 is engaged for a forward transmission ratio as well as the reverse transmission ratio, merely because of the illustrated automatic control logic and its associated planetary gear system, a detailed discussion of which is unnecessary for an understanding of the present invention.

If the vehicle engine 11 cannot be started in the usual manner with the conventional starting motor (not shown), the engine may be started by moving the vehicle, by pushing or towing it with another vehicle, for example. The present invention enables the normally driven wheels 60, which are coupled to the transmission output shaft 34 in the conventional manner, to drive the engine 11 through the transmission 38 with the proper transmission ratio between the output shaft 34 and the transmission input shaft 62.

To this end, an auxiliary transmission oil supply pump 64 is driven by the output shaft 34 to draw oil from the reservoir 13 through a conduit 68 and to deliver pressurized oil through a conduit 70 to the direction control valve 18, through a conduit 72 to the transmission lubrication system, and through a conduit 74 to the input of the main transmission pump 12, the conduit 74 communicating with the conduit 15 intermediate the check valve 14 and the pump 12. The check valve 14 insures that the output of the auxiliary pump 64 is not returned to the reservoir 13 through the conduits 74 and 15. The auxiliary pump 64 may be a conventional positive displacement rotary pump, for example.

The direction control valve 18 is constructed so as to selectively communicate the conduit 70 with a conduit 76, which in turn communicates with the conduit 55 through a conventional double check valve 78, which includes a spring-biased piston 79. The check valve 78 insures that pressurized oil in either the conduit 76 or a conduit 80 communicating with the spool valve 30, will be delivered to the conduit 55 and hence to the clutch 25, and yet the conduits 76 and 80 are isolated from each other under all conditions.

When the direction control valve 18 is in the neutral and reverse positions, the conduit 76 is vented and the output of the auxiliary pump 64 cannot be used to select a transmission ratio for a push or tow start. When the direction control valve is in forward position, however, the conduit 70 is communicated with the conduits 76 and 55 and hence the clutch 25.

The displacement of the main pump 12 is sufficiently larger than that of the auxiliary pump 64 that the output of the auxiliary pump is substantially absorbed or "swallowed" by the main pump when the engine 11 is running. Accordingly, the clutch 25 is not energized by the output of the pump 64, even though they are in direct communication.

In order to start the engine 11 by moving the vehicle, the direction control valve 18 is put in the forward position and the vehicle is pushed or towed. The auxiliary pump 64 is driven by the wheels 60 through the output shaft 34 so as to deliver pressurized oil through the conduits 70, 76 and 55 to the clutch 25, thus engaging the clutch 25 to establish the desired push-start transmission ratio between the output shaft 34 and the input shaft 62, which is connected to the engine 11 in the conventional manner.

Before the engine 11 is started, the main pump 12 is not driven sufficiently by the engine to supply sufficiently pressurized oil through the conduit 46 and the spool valves 29 and 30 to engage any of the clutches 21–25. Accordingly, the automatic control logic exerts no control over the transmission 38 during a push start. In addition, the main pump 12 is not able to supply adequate oil through the conduit 19 for lubrication purposes before the engine is started, but adequate lubrication is insured by the auxiliary pump 64 through the conduit 72.

When the engine 11 starts, it drives the main pump 12 sufficiently so that the latter absorbs the output of the auxiliary pump 64, thereby disengaging the clutch 25. The control of the transmission 38 is automatically shifted to the automatic control logic, inasmuch as the clutches 21–25 respond to the positions of the spool valves 29 and 30, to which sufficiently pressurized oil is supplied by the main pump 12.

It is to be understood that the above-described embodiment of the invention is susceptible to modifications and substitutions by those skilled in the art without departing from the spirit and scope of the invention. For example, the desired transmission ratio for push starting could be selected in a transmission having one or more torque converters by charging a torque converter directly from the auxiliary pump when the direction control valve is in the forward position. Accordingly, all such substitutions and modifications are to be included in the scope of the invention as defined by the following claims.

I claim:

1. A vehicle automatic transmission comprising an input shaft adapted to be coupled to the vehicle engine, an output shaft adapted to be coupled to the driven wheels of the vehicle, drive means connecting the input shaft to the output shaft with an adjustable transmission ratio, automatic control means for adjusting the transmission ratio of the drive means, a first pump adapted to be driven by the vehicle engine for delivering pressurized liquid to the automatic control means, means for selecting a predetermined transmission ratio of the drive means, a second pump driven by the output shaft for delivering pressurized liquid to energize the selecting means so as to select the predetermined transmission ratio, and means for selectively communicating the output of the second pump with the selecting means independently of the automatic control means, whereby the vehicle engine may be started by moving the vehicle so as to drive the engine from the wheels at the predetermined transmission ratio, the automatic control means exerting no control over the transmission ratio of the drive means before the engine is started.

2. An automatic transmission according to claim 1, wherein a plurality of transmission ratios may be selected by the automatic control means, and the predetermined transmission ratio selected in response to pressurized liquid from the second pump is one of the transmission ratios that may be selected by the automatic control means.

3. An automatic transmission according to claim 2, wherein the output of the second pump is also communicated with the input of the first pump, and the displacement of the first pump exceeds that of the second pump such that the output of the second pump is sufficiently diverted to the first pump when the engine is started so that the selecting means is automatically de-energized and the transmission ratio of the drive means is controlled by the automatic control means.

4. An automatic transmission according to claim 3, including a plurality of clutch means responsive to the automatic control means for selecting the plurality of transmission ratios, and wherein the means for selecting the predetermined transmission ratio includes at least one of the clutch means.

5. An automatic transmission according to claim 2, including a plurality of clutch means responsive to the automatic control means for selecting the plurality of transmission ratios, and wherein the means for selecting the predetermined transmission ratio includes clutch means.

6. An automatic transmission according to claim 5, wherein the clutch means for selecting the predetermined transmission ratio includes at least one of the clutch means responsive to the automatic control means.

7. An automatic transmission according to claim 1, including manual direction control valve means having forward, neutral and reverse positions, the manual control valve means communicating the output of the first pump with the automatic control means when in the forward position, and the manual control valve means including the means for selectively communicating the output of the second pump with the selecting means such that the second pump is communicated with the selecting means when the manual control valve means is in the forward position.

8. An automatic transmission according to claim 7, wherein the output of the second pump is also communicated with the input of the first pump, and the displacement of the first pump exceeds that of the second pump such that the output of the second pump is sufficiently diverted to the first pump when the engine is started so that the selecting means is automatically de-energized and the transmission ratio of the drive means is controlled by the automatic control means.

\* \* \* \* \*